Nov. 13, 1962  B. M. GORDON  3,063,635
SYSTEM FOR MEASURING THE WEIGHT OF DYNAMIC LOADS
Filed Nov. 2, 1959  2 Sheets-Sheet 1

*INVENTOR.*
BERNARD M. GORDON
BY
ATTORNEY

INVENTOR.
BERNARD M. GORDON

United States Patent Office

3,063,635
Patented Nov. 13, 1962

3,063,635
SYSTEM FOR MEASURING THE WEIGHT OF DYNAMIC LOADS
Bernard M. Gordon, Newton, Mass., assignor to Epsco, Incorporated, Cambridge, Mass., a corporation of Massachusetts
Filed Nov. 2, 1959, Ser. No. 850,339
10 Claims. (Cl. 235—151)

This invention relates in general to a system for extracting a signal from accompanying noise and more particularly pertains to electrical apparatus for automatically measuring the weight of dynamic loads.

The invention is applicable generally to a system for extracting a signal from noise by employing a selected portion of an input signal, the selected or "optimum" portion being that part of the input signal whose content is the desired signal accompanied by a minimum of noise. The invention utilizes a time gate governed in a manner causing a time slice to be taken out of the input signal. Only that portion of the input signal within the time slice is operated upon in subsequent stages of the invention, the remainder of the input signal being discarded. In one embodiment of the invention, the gated portion of the signal is passed into a smoothing filter which removes most of the noise components and the filtered output is then integrated to further remove noise components and to derive an analog voltage. The output of the integrator furnishes the input to an analog-to-digital converter, that converter providing a digitized output to activate a display unit.

In another embodiment, the invention resides in a systematic arrangement of apparatus for determining the weight of a body such as a railroad car or a truck, while the body is in motion. A transducer is employed to obtain electrical signals from pressure by causing the body being weighed to bear upon the transducer. The electrical output of the transducer contains signal components which arise from the motion of the body and that dynamic data must be removed to prevent erroneous weight determinations. In accordance with the invention, the output of the transducer is filtered to eliminate undesired higher frequency components. The output of the filter (which still contains undesired lower frequency components) is fed into an analog-to-digital encoder and is there converted to a digital code. Over a predetermined interval, the output of the filter is sampled periodically by the converter. The digitized samples are averaged by changing the digital code of each sample to a train of pulses and dividing the total number of pulses by the number of samples.

The arrangement of the invention together with its manner of operation can be better understood by a perusal of the following detailed description when considered in conjunction with the accompanying drawings wherein.

Figure 1:
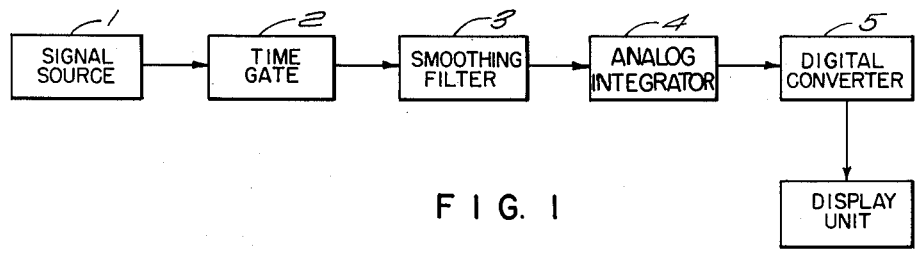
FIG. 1 depicts the schematic arrangement of a simplified form of the invention.
Figure 2:
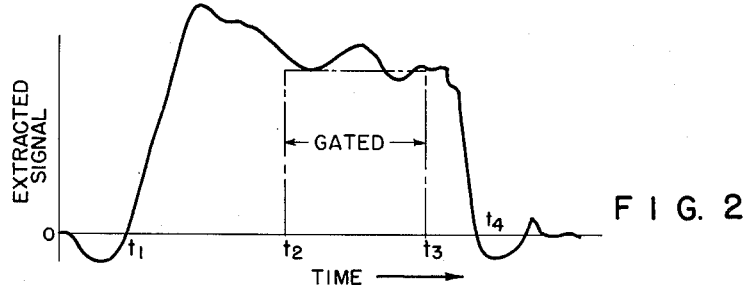
FIG. 2 is exemplary of the manner in which the output signal of a transducer may vary in time.
Figure 3:
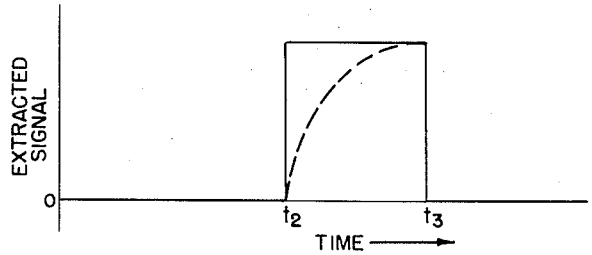
FIG. 3 shows an ideal form of the signal extracted from the waveform of FIG. 2.

Referring now to FIG. 1, there is shown in schematic form an embodiment of the invention. The signal source 1 provides a signal having a waveform characterized by the waveform shown in FIG. 2. The waveform of FIG. 2 is a complex wave consisting essentially of a D.C. level combined with low and high frequency noise components. It will be noted that at time $t_1$ the wave rises abruptly; after a settling interval, the wave exhibits the least perturbation between times $t_2$ and $t_3$; and at time $t_4$ the wave descends abruptly. Assuming that it is desired to extract the D.C. signal from the complex wave, it can be apprehended that the portion of the signal in the interval between $t_2$ and $t_3$ is that part of the signal whose content is the desired signal accompanied by a minimum of noise. By employing a gate 2 in the scheme of FIG. 1 to permit only that portion of the input signal between times $t_2$ and $t_3$ to pass, those remaining parts of the input signal, which when averaged would provide an erroneous D.C. level, are excluded from further consideration. That portion of the input signal in the interval between times $t_2$ and $t_3$ is passed by time gate 2 and is applied to the input of a smoothing filter 3 which acts to remove most of the noise components in the time sliced signal. With an ideal smoothing filter, the output of the filter would be the rectangular wave shown in FIG. 3. With any form of realizable smoothing filter, however, the extracted signal will be something less than ideal and will have some noise components associated therewith. However, it is known that randomly occurring noise, when integrated over a sufficiently long interval is equal to zero. Hence, by integrating over the entire time slice period, that is, the interval between $t_2$ and $t_3$, the randomly occurring noise in the output of the smoothing filter will tend toward zero. For this reason, it is advisable to take the time slice over a broad portion of the input signal as is feasible. The output of smoothing filter 3 is applied to the input of an analog integrator 4 of any suitable type. In its simplest form, the analog integrator may be an R-C (resistance-capacitance) series network with the integrated output taken across the capacitor. At time $t_3$ the output of analog integrator 4 is impressed upon the input of a digital converter 5 which thereupon provides a digital output directly related to the magnitude of the analog input. The analog-to-digital converter may be of the type shown in pending application Serial No. 842,280, filed September 25, 1959. The converter disclosed therein provides a train of output clock pulses, the length of the train being governed by the magnitude of the analog input. Other types of analog-to-digital converters are known which provide a digitally coded output over a plurality of parallel output lines. The output of converter 5 is fed to a display unit 6 which may take a multitude of forms. The display unit 6 may be a counter exhibiting decimal digits in a window in the manner of a digital voltmeter. In other forms, the display unit may be a printer actuated by converter 5 for printing digits upon a paper ribbon or the display unit may be a perforator which records and stores the output on a perforated tape. The manner in which the ultimate output of the system is displayed is not significant to the essential operation of the invention. Additional components may be required between the digital converter 5 and the display unit 6 to make the output of the converter compatible with input requirements of a specific display unit. Such modifications are readily accomplished without any alteration in the basic scheme of the invention.

Some mechanism must be provided to actuate the time gate 2 so that the gate opens a time $t_2$ and closes at time $t_3$. The type of mechanism employed will, of course, depend upon the character of the signal furnished by the source 1. For example, where the source signal is intermittent and time $t_2$ invariably occurs a fixed period after an event which activates the source, then the event can be used to actuate a delay mechanism which opens the gate after the proper interval. To be more specific, if the event is the application of heat to a thermocouple, and the output of the thermocouple settles down at time $t_2$, then at the time the heat is first applied, a switch may be tripped to actuate a delay circuit which opens the time gate at time $t_2$ and closes it at time $t_3$.

Where the signal from source 1 has a singularity which precedes time $t_2$, the unique characteristic of the signal may be utilized to time the opening of gate 2. For example, if in the waveform of FIG. 2 time $t_2$ were preceded by the wave crossing the zero axis only at time $t_1$, then the axis crossing may be detected by a mechanism which provides a delayed signal to open gate 2 at the proper time.

The manner of regulating time gate 2 to provide a time slice from the input signal, may depend upon the characteristics of the input signal, upon the event which inaugurates the signal, or upon the regularity of a periodically recurring phenomenon. Whatever mechanism is employed, it can be considered satisfactory if the gate is opened for an interval sufficient to permit the optimum portion of the input signal to be passed.

Figure 4:
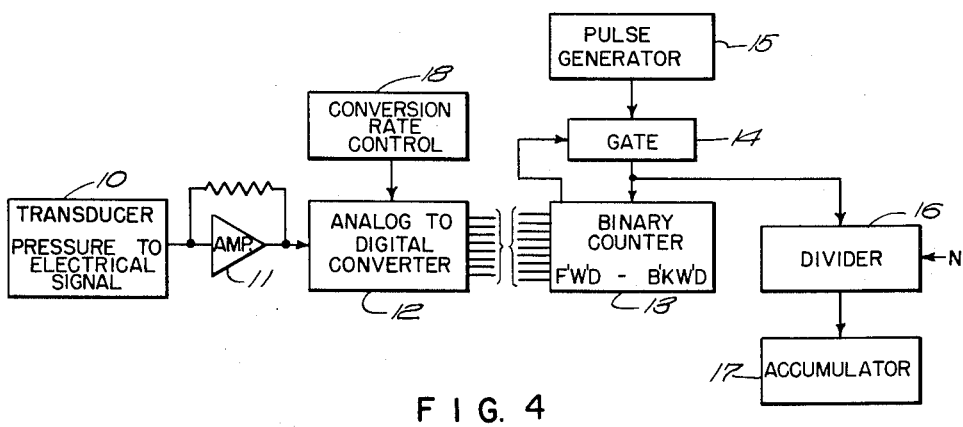
FIG. 4 illustrates an embodiment of the invention in generalized form.

Referring now to FIG. 4, there is shown a simplified form of a digital data averaging system having one input parameter to be measured, the weight of a moving freight car. The freight car weight is montiored by a transducer 10 which converts pressure to an electrical signal as each truck of the freight car passes over a section of rail known as the weighing bed. The transducer may be any suitable device, but is preferably a strain guage of the type in which the voltage output of the gauge is proportional to the pressure exerted upon the load cell of the gauge. The voltage output of the load cell would be proportional to the weight of the freight car's truck if that car were static, but it has been found in practice that due to the motion of the freight car, the output voltage of the gauge representing the weight of the car's truck is modulated by electrical signals due to vibrations in the weighing bed and swaying of the moving freight car being monitored. Since the output of the strain gauge is usually a low-level signal, the output of the gauge is enhanced by an amplifier 11 and the amplifier's output is fed into an analog-to-digital converter 12. The information available from the amplifier's output is sampled at a rate determined by a control mechanism 18 and the voltage level of each sample is translated into a digital code by the converter 12. Assuming, for example, that the conversion rate control 18 permits the converter to sample the output of the amplifier at a rate of 500 samples per second, then the converter provides 500 discrete digital codes at its output in each second. Each of these discrete codes is transmitted through parallel lines to a binary counter 13. That binary counter is of a type known as a forward-backward counter and, as the name implies, the process of addition which is carried on in the counter when a "forward" input is applied, is reversed upon the application of a "backward" input, in other words, an input pulse can cause the number in the binary counter to be increased or decreased by one, depending upon whether the pulse is a "forward" or "backward" input. After the analog voltage has been changed to a digital code by converter 12 and the parallel output of the converter has been set into the counter 13 a gate 14 is opened permitting pulses from a generator or clock 15 to run counter 13 backwards toward zero. It is desirable to have counter 13 count down to zero in a short time and therefore the pulse repetition rate of generator 15 is preferably in the order of one megacycle. The gated clock pulses from generator 15 employed for count down are set into a digital divider 16 and the output of the divider, in turn, is applied to an accumulator 17. The division factor N is equal to the number of samples taken during one measurement, in this case 500. For each 500 pulses set into the divider 16, there is emitted by the divider an output pulse so that the total number of pulses received by the accumulator 17 is, in effect, an average of the 500 data samples. Accumulator 17 is preferably a decimal counter which may be of a conventional type, and totals the number of pulses obtained from the output of divider 16. The accumulator 17 may be arranged to visually display the total count therein in decimal digital form.

When each truck of the freight car which is to be weighed moves onto the transducing apparatus, the motion of the car results in vibrations which cause noise transients of large magnitudes in the output obtained from the strain gauge 10. Some of the transients are of relatively short duration and disappear after a short "settling" interval. However, some low frequency noise is always present during the weighing time, even after the vibration produced transients disappear, that low frequency noise varying from two to six cycles per second. An objective of the present arrangement is to filter out the low frequency noise that is always present during the weighing time. Sampling the weighing signal a large number of times over a short period is tantamount to continuous averaging and eliminates the effects of input dynamics. Essentially, therefore, the entire arrangement constitutes a complex non-linear filter in which digital operations are utilized to average binary data.

Figure 5:
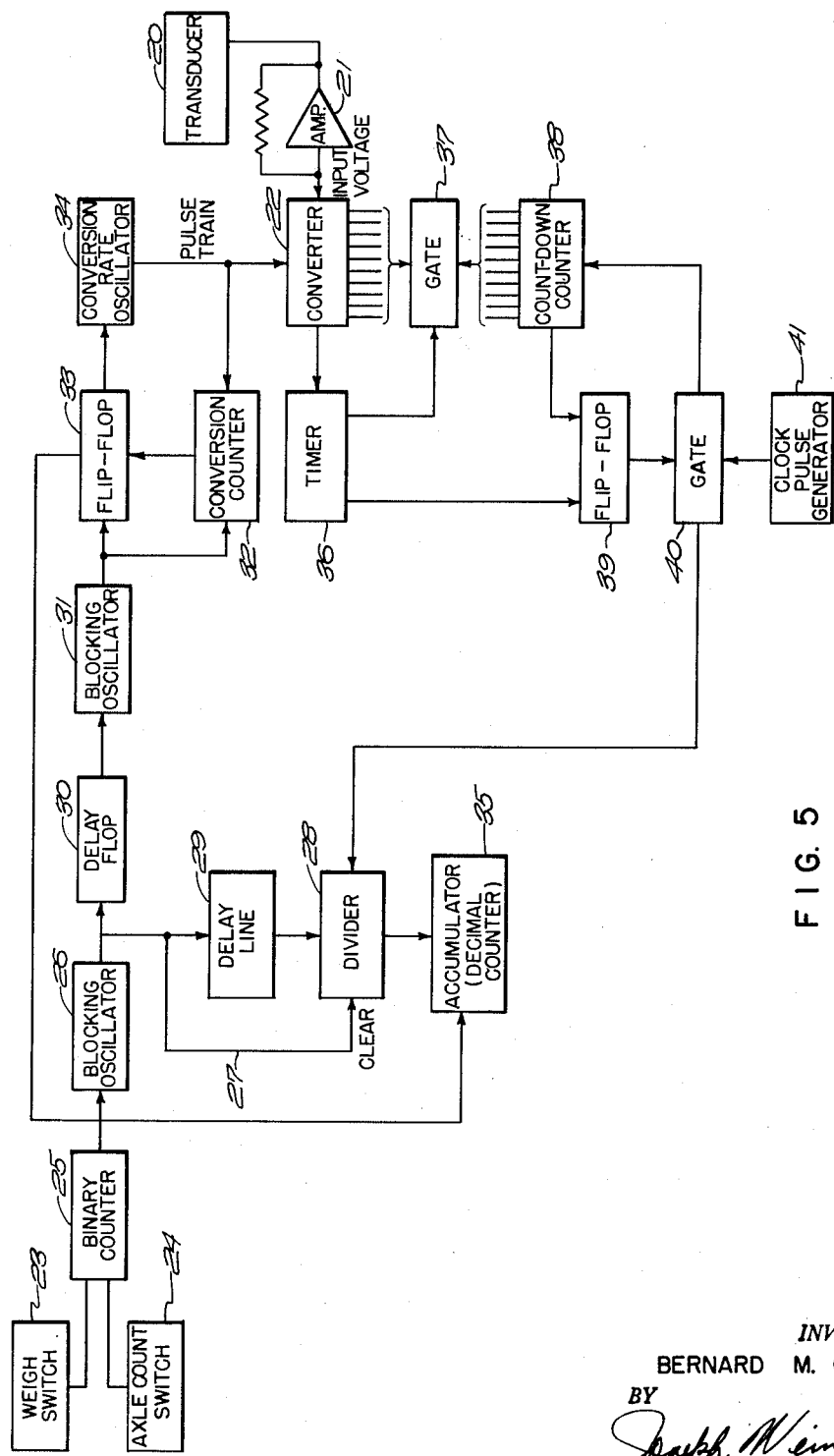
FIG. 5 is a schematic representation of an embodiment of the invention intended for the measurement of dynamic loads.

Referring now to FIG. 5 which schematically illustrates the details of a system embodying the invention, there is shown a transducer 20. A device such as a strain cell whose electrical resistance is a function of the pressure applied thereto is an example of such a transducer. Where a strain cell is arranged in a bridge circuit so that the unbalance of the bridge due to the variation of electrical resistance of the cell is a measure of the pressure applied to the device, then the cell and its bridge are considered to constitute a transducer. The electrical signal derived from the transducer is fed into an amplifier 21 and the output of the amplifier is impressed upon an analog-to-digital converter 22. The converter 22 may, for example, be of the type described in Patent No. 2,989,741. The amplifier 21 is of the "operational" type and is arranged to filter out undesired frequency components contained in the signal from the transducer. In order that the equipment shall not operate when the locomotive or its tender is passing over the weighing section, a weight switch 23 is held at the "off" position until the first wheel of the leading truck of the first freight car is about to move over the weighing section. An axle count switch 24, located underneath the weighing bed, is arranged to count the number of axles passing over it. The weight switch prevents the apparatus from weighing the engines and tenders which may be hauling the freight cars. When the weight switch is in the "off" position, a binary counter 25 is held in a state where it cannot accept the pulses from the axle count switch. Upon the weight switch 23 being moved to the "on" position, binary counter 25 is permitted to accept pulses from the axle count switch, the latter switch providing one pulse for each axle crossing switch 24 sets counter 25 to a "one" condition and the next pulse from axle crossing position, indicating that all the wheels of a truck are on the weighing bed, causes the binary counter to return to "zero" resulting in an output pulse being transmitted to the blocking oscillator 26. The binary counter output pulse triggers the blocking oscillator 26 which thereupon generates a pulse. The output pulse from blocking oscillator 26 is transmitted over conductor 27 to the divider 28 and clears the divider to all zeros. The output pulse after being retarded by delay line 29 for a period sufficient to allow the divider to be completely reset, then presets the divider to the complement of N, where N is the number of measurements to be made and averaged. The output pulse from blocking oscillator 26 also fires the delay flop 30 and after the expiration of the pre-measurement delay period, the delay flop emits a pulse which triggers blocking oscillator 31. The output pulse from blocking oscillator 31 is transmitted to conversion counter 32 where it serves to set the complement of N into the conversion counter. The output of blocking oscillator 31 also is applied to the input of flip-flop 33 and sets that flip-flop to the "1" condition. A conversion rate oscillator 34, preferably a relaxation oscillator of the multivibrator type, is held in an inoperative state when the flip-flop 33 is in the "0" condition and becomes a free-running oscillator when the flip-flop 33 is in the "1" condition. Relaxation oscillator 34 generates pulses at the selected measurement rate and those pulses are used to trigger the analog-to-digital converter 22 for successive conversion of the input voltage. For example, if 500 measurements are to be made each second, the oscillator 34 must then supply 500 pulses in each second to the converter 22. When flip-flop 33 is set to the "1" condition, it emits a pulse which is transmitted to the accumulator 35 and causes the accumulator to clear to an all "0" condition. The first pulse coming out of rate oscillator 34 triggers the converter 22 to cause the first conversion of the input voltage. As described previously, the analog-to-digital converter accepts the input voltage and converts it to digital form. The encoder 22 acts very rapidly and the conversion of the input voltage to digital form is accomplished in a period of 40 to 50 microseconds. After the input voltage has been encoded, a timing circuit 36 opens a gate 37 and causes the encoded number in the converter 22 to be transmitted over the parallel lines to count-down counter 38. A binary number representing the weight as measured in fifty-pound increments is now stored in the count-down counter 38. Several microseconds after this gating procedure has been completed, timing circuit 36 emits a pulse which sets flip-flop 39 in a condition such that gate 40 is opened. A second input to gate 40 is obtained from an electronic clock 41 which preferably provides pulses at the rate of 1 pulse each microsecond. The clock 41 may take the form of a free-running miltivibrator having a frequency of one megacycle. With flip-flop 39 in the "1" condition, pulses from clock 41 are transmitted through gate 40 to count-down counter 38 and to divider 28. The gated clock pulses going to both the countdown counter 38 and divider 28, in the example chosen, occur at the rate of one million per second, and cause the count-down counter rapidly to count to the condition representing "0." That is, the pulses from clock 41 cause the count-down counter to count backwards from the number entered into it by the converter 22 until the number of clock pulses equal the number of fifty-pound increments of weight whereupon the count-down counter emits a pulse which resets flip-flop 39 and closes gate 40. The resetting of flip-flop 39 constitutes the finish of the first conversion for the first measurement. The gated clock pulses advance divider 28 and after N pulses enter the divider, the divider emits an output pulse which is transmitted to accumulator 35 and advances that mechanism. Thus, where 500 measurements are to be made and averaged, the divider emits an output pulse for each 500 gated clock pulses entering the divider. Accumulator 35 counts the number of output pulses from divider 28 and, therefore, the sum in the accumulator at the end of the measurement (time slice) interval is the weight of the truck of the freight car averaged over 500 measurements.

While several preferred embodiments of the invention have been illustrated, it is to be understood that modifications and variations may be made or other embodiments constructed without departing from the essence of the invention. Therefore, it is intended that the invention not be limited to the specific apparatus illustrated but that the scope of the invention be construed in consonance with the appended claims.

What is claimed is:

1. A system for measuring the weight of a dynamic load comprising a transducer for providing an electrical signal in response to said dynamic load, a filter for removing undesired frequency components from said electrical signal, an analog-to-digital converter having its input coupled to said filter and its output coupled to a reversible binary counter, a control mechanism associated with said converter for causing said converter to operate upon its input signal only during a predetermined time interval, a generator of clock pulses, a gate for applying clock pulses to run said counter backward to cause the count set into the counter by the converter to be reduced to zero, an accumulator, and means for coupling clock pulses passing through said gate to said accumulator.

2. A measuring system comprising a transducer for providing an electrical signal representing the quantity to be measured, said signal having noise and undesired frequency components associated therewith, a filter coupled to the output of said transducer for removing undesired frequency components from said electrical signal, an analog-to-digital converter having its input derived from said filter and its output coupled to a reversible binary counter, a control mechanism governing said converter, said control mechanism causing said converter to make a plurality of conversions during a predetermined time interval, a generator of clock pulses, a gate for applying clock pulses to run said counter backward to cause the count set into the counter by the converter at each conversion to be reduced to zero, an accumulator, and a divider coupling clock pulses passing through said gate to said accumulator.

3. A measuring system comprising a transducer for providing an electrical signal representing the quantity to be measured, said signal having noise therein, an analog-to-digital converter having its input coupled to said transducer and having its output coupled to a reversible binary counter, a control mechanism governing the operation of said converter, said control mechanism permitting said converter to intermittently operate only during a predetermined time interval, a generator of clock pulses, means for gating clock pulses into said counter to cause said counter to run backward until the count set into the counter by the converter is reduced to zero, an accumulator, and means for coupling clock pulses from said gating means to said accumulator.

4. A measuring system comprising a transducer providing a complex wave formed by noise and the desired signal representing the quantity subject to measurement, a filter responsive to said complex wave for removing undesired frequency components therefrom, an analog-to-digital converter having its input coupled to said filter, said converter having a parallel line output connected to a reversible digital counter for setting a digital count therein, a control mechanism permitting said converter to operate only during a predetermined time interval, a source of clock pulses, means for gating clock pulses from said source into said counter until the count set therein by the converter is reduced to zero, a divider for dividing the number of gated clock pulses by a factor equal to the number of conversions made during said time interval, and an accumulator for counting the dividend.

5. A measuring system comprising: a source providing a complex signal formed by random noise, undesired frequency components, and a signal representing the quantity subject to measurement; a filter responsive to said complex wave for removing at least some of the lower frequency undesired components therefrom; an analog-to-digital converter having its input derived from said filter, said converter at the conlusion of each conversion providing an output over parallel lines; a reversible digital counter having said parallel lines coupled to its input whereby a digital count is concurrently set into said computer in response to the output of said converter; a control mechanism permitting said converter to operate only during a predetermined time interval, said control mechanism causing said converter to make a plurality of conversions during said time interval; a generator of clock pulses; a gate operable at the conclusion of each conversion for directing said clock pulses into said counter until the count set therein by the converter is reduced to zero; a divider coupled to said gate for dividing the number of gated clock pulses by a factor equal to the number of conversions made during said time interval, said divider serially emitting dividend pulses; and an accumulator for counting said dividend pulses.

6. A system for extracting a desired signal from an input signal having a complex wave formed by noise components and the desired signal, said system comprising an analog-to-digital converter, a timing mechanism governing said converter, said timing mechanism causing said converter to operate only during an interval when the optimum portion of said wave is applied to the input of said converter, said mechanism causing said converter to make a plurality of conversions during said interval, said converter providing a digital output over parallel lines at the conclusion of each conversion, means for changing the parallel digital output of said converter to a train of pulses, and means for dividing the number of pulses in said train by a factor equal to the number of conversions made during said interval.

7. A system for extracting a desired signal from an input signal having a complex wave formed by noise and the desired signal, said system comprising an analog-to-digital converter having said complex wave applied to its input, control means governing said converter and causing said converter to operate only during a predetermined interval in which the optimum portion of said wave is applied to the input of said converter, said control means causing said converter to make a plurality of conversions during said interval, said converter at the conclusion of each conversion providing a digital output over parallel lines, a reversible digital counter connected to the parallel line output of said converter, said converter at the end of each conversion causing a digital counter to be set into said counter, means connected to said counter for providing a train of serial pulses, the number of pulses in said train being determined by the count in said counter, and means for averaging the number of train pulses over said predetermined interval.

8. A system for extracting a desired signal from an input signal having a complex wave formed by random noise, undesired frequency components, and the desired signal, said system comprising a filter for removing some of said undesired frequency components from said complex wave, an analog-to-digital converter having its input coupled to said filter, control means causing said converter to operate only during a predetermined interval, a source of conversion rate signals coupled to said converter for causing said converter to make a fixed number of conversions during said interval, a reversible digital counter, means operative at the conclusion for each conversion for gating the output of said converter to said counter to set a counter therein, means controlled by said counter for providing a pulse train having a number of pulses corresponding to the digital count set in the counter by causing said counter to run backward until the digital count is reduced to zero, and means for dividing the number of pulse in said train by a factor equal to the said fixed number of conversions.

9. A system for extracting a desired signal from an input signal having a complex wave formed by noise and the desired signal, said input signal being characterized by an optimum portion of said wave in which said noise is at a minimum, said system comprising an analog-to-digital converter, means coupling said input signal to said converter, control means causing said converter to operate only during the interval in which said optimum portion is present at the input of said converter, a source of conversion rate signals coupled to said converter for causing said converter to perform a plurality of conversions during said interval, a reversible digital counter, means for gating the output of said converter to said counter at the termination of each conversion to set a count into said counter, a source of clock pulses, a gate for coupling clock pulses from said source to said counter to run said counter backward until the count is reduced to zero, an accumulator, and a divider coupled between said gate and said accumulator.

10. A system for extracting a desired signal from an input signal having a complex wave formed by noise and the desired signal, said input signal being characterized by an optimum portion of said wave in which said noise is at a minimum, said system comprising an analog-to-digital converter, means coupling said input signal to said converter, control means causing said converter to operate only during the interval in which said optimum portion is present at the input of said converter, a source of conversion rate signals coupled to said converter for causing said converter to perform a plurality of conversions during said interval, a reversible digital counter, means for conveying the output of said converter at the termination of each conversion to said counter to cause a digital count to be set therein, a source of clock pulses, a gate for coupling clock pulses from said source to said counter to cause said counter to run backward until its count is reduced to zero, a divider coupled to said gate for dividing the number of gated clock pulses by a factor equal to the number of conversions made during said interval, said divider emitting dividend pulses, and an accumulator coupled to said divider for counting said dividend pulses.

No references cited.

UNITED STATES PATENT OFFICE
CERTIFICATE OF CORRECTION

Patent No. 3,063,635                           November 13, 1962

Bernard M. Gordon

It is hereby certified that error appears in the above numbered patent requiring correction and that the said Letters Patent should read as corrected below.

Column 8, line 1, for "counter", second occurrence, read -- count --.

Signed and sealed this 30th day of April 1963.

(SEAL)
Attest:

ERNEST W. SWIDER                      DAVID L. LADD
Attesting Officer                       Commissioner of Patents